United States Patent [19]

Sable

[11] 4,395,140
[45] Jul. 26, 1983

[54] BEARING MOUNTING WITH HYDRAULIC FASTENING MEANS FOR CRANES AND THE LIKE

[75] Inventor: Harvey J. Sable, Hudson, Ohio
[73] Assignee: Rotek Incorporated, Aurora, Ohio
[21] Appl. No.: 307,780
[22] Filed: Oct. 2, 1981
[51] Int. Cl.³ .............................................. F16C 27/00
[52] U.S. Cl. ...................................... 384/99; 308/222
[58] Field of Search ............... 308/184 R, 184 A, 222,
308/221, 207 A, 207 R, 189 A, 220; 384/99

[56] References Cited

U.S. PATENT DOCUMENTS

| | | | |
|---|---|---|---|
| 3,125,226 | 3/1964 | Mork et al. | 212/38 |
| 3,130,628 | 4/1964 | Blinn | 85/1 |
| 3,941,252 | 3/1976 | Six et al. | 212/69 |
| 3,962,950 | 6/1976 | Piroska | 85/32 R |
| 4,161,344 | 7/1979 | Delarbre et al. | 308/222 |
| 4,248,488 | 2/1981 | Sable | 308/220 |
| 4,336,968 | 6/1982 | Hibner | 308/184 R |

FOREIGN PATENT DOCUMENTS

| | | |
|---|---|---|
| 1092171 | 4/1959 | Fed. Rep. of Germany . |
| 1132766 | 7/1962 | Fed. Rep. of Germany . |
| 1147444 | 4/1963 | Fed. Rep. of Germany . |
| 2455788 | 8/1976 | Fed. Rep. of Germany . |
| 2143917 | 6/1972 | France . |

OTHER PUBLICATIONS

SKF Publication entitled "SKF Hydraulic Bolts for Pre-determined Axial and Radial Interference Fit", Publication date unknown but prior to Oct. 2, 1980.

*Primary Examiner*—Lenard A. Footland
*Attorney, Agent, or Firm*—Yount & Tarolli

[57] ABSTRACT

An apparatus, such as a crane, having a bearing for rotatably connecting two structures and transmitting radial, axial, rotational and moment forces from one to the other. The bearing is separably mounted to one of the structures by threaded fasteners, e.g., bolts, having piston means associated with the fasteners with the hydraulic system being pressurized during operation to establish proper uniform preloading of the fasteners for transmitting the load forces from one structure to the other.

13 Claims, 5 Drawing Figures

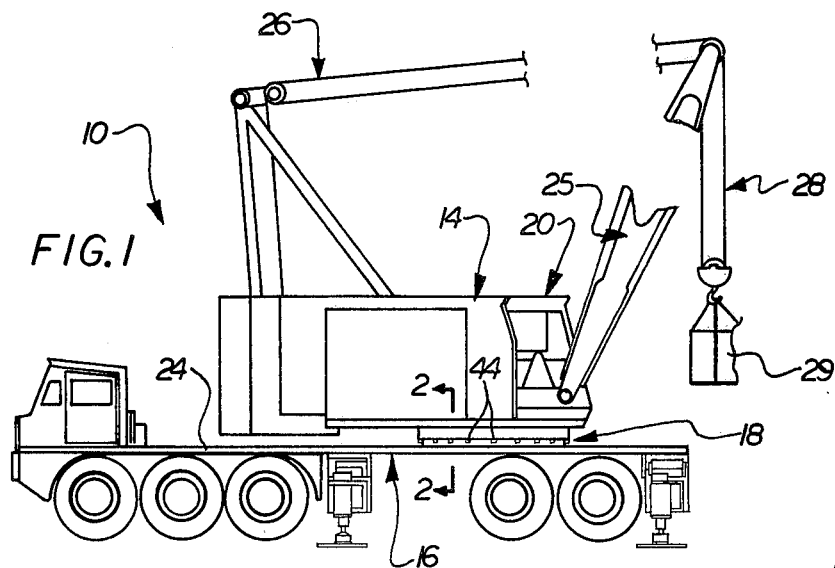
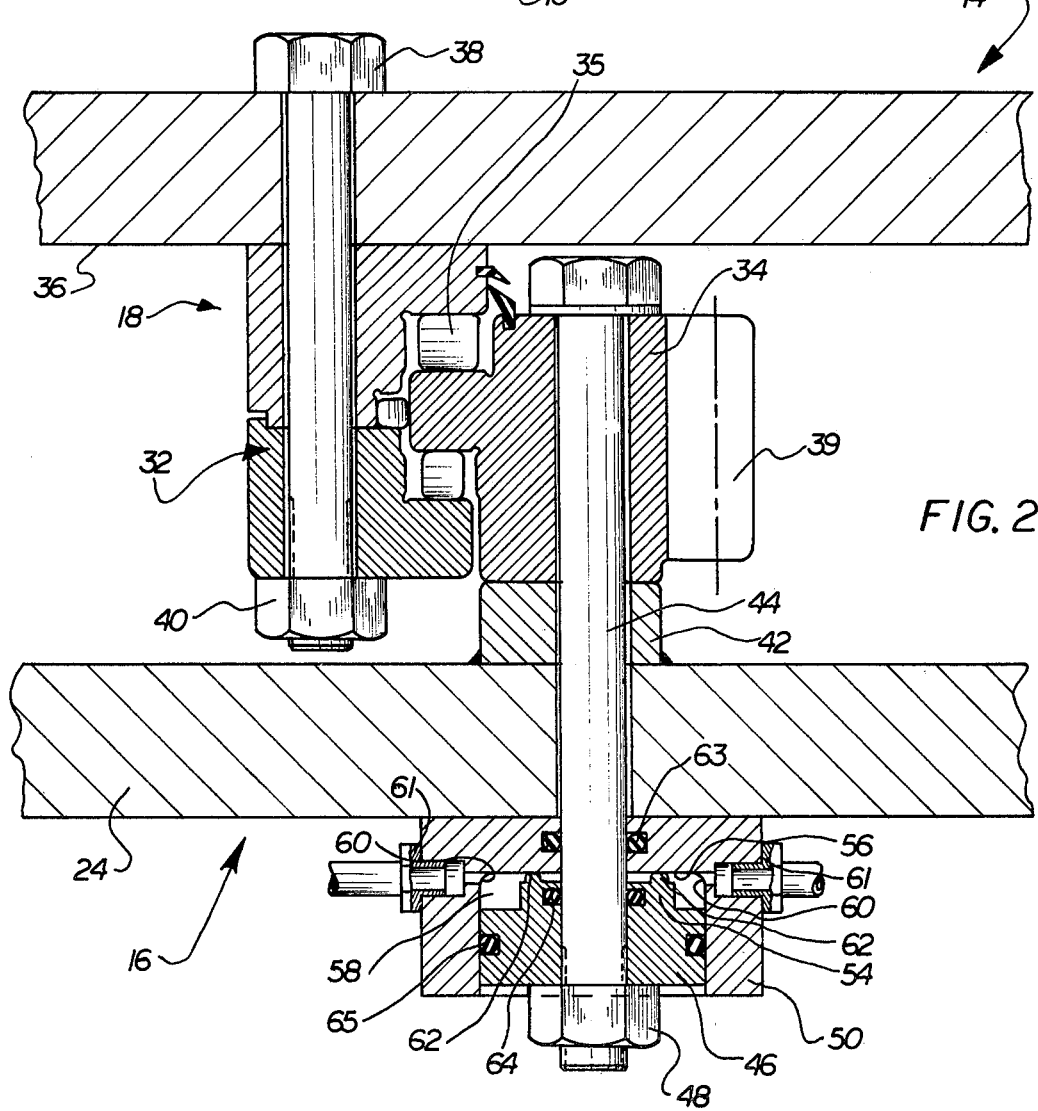

BEARING MOUNTING WITH HYDRAULIC FASTENING MEANS FOR CRANES AND THE LIKE

BACKGROUND OF THE INVENTION

The present invention relates to mountings for bearings which are to transmit high loads, particularly moment loads from an upper structure to a base structure and such a mounting in which the bearing is to be relatively easily disconnected from one of the structures. The invention is particularly useful in material handling apparatus, such as cranes and earth handling machinery having a rotatable upper structure which is releasably connected to a base or carrier by a bearing.

Cranes and other material handling apparatus commonly have what is referred to as an upper structure which is rotatable to horizontally swing a boom thereon. The upper structure commonly includes an operator cab and controls and machinery for operating the boom. A bearing is provided for supporting the upper structure on the base or carrier to provide for rotation of the upper structure about a vertical axis and for transmission of axial, radial and moment forces from the upper structure to the base.

In cranes and other material handling machinery, it is highly desirable to be able to quickly connect and disconnect the upper structure with respect to the base. The ability to do this enables the bearing to be readily repaired, maintained or replaced. It also enables the upper structure to be disconnected from the base so that the base and upper structure can be transported separately to a new job site. This frequently occurs when mobile cranes are involved. Depending upon the size of the crane or other material handling machinery with a rotatable upper structure, highway axle load limits may be exceeded and difficulty may be encountered in clearing low bridges. In the case of mobile equipment the upper structure from the base may be shipped on a flat bed truck while the stripped mobile carrier moves by its own power.

Commonly, bearings on cranes and the like for releasably and rotatably mounting the upper structure on the base or carrier involve bolts which extend through the base or carrier and a bearing member. Nuts are threaded onto the bolts and are torqued to provide high clamping forces between the bearing and base and an axial preloading for the bolts. A connection of this type is shown in U.S. Pat. No. 3,125,226 to Mork et al. To transmit high loads, and particularly high moment loads, through the bearing between the rotatable and stationary structure, these bolts must be preloaded to a uniformly high value. This requires considerable labor and a substantial amount of time in view of the large number of clamping bolts. It is also difficult to release the nuts when it is desired to separate the bearing from one of its mounting structures. Moreover, when a varying axial load is applied to the bolts as a result of a working load applied to the rotatable structure, they are susceptible to fatigue failure, particularly as bolt preload is lost through embedment or lack of maintenance.

In a known interference bolt which has been considered for use with crane bearings, the bolt has an internal hydraulic chamber into which oil may be supplied under high pressure to elongate the bolt. When assembling one member to another with such a bolt, high pressure is established in the chamber to elongate the bolt so that it may be readily inserted into bolt holes in the member. A nut is threaded onto the bolt to a clamping position, and then the oil pressure released so that the elongated bolt resumes its original shape to provide axial preloading and a radial interference fit with the bolt hole. Such bolts, however, weaken the inherent clamping capacity of the bolt because of the removal of material along the axis of the bolt to form the hydraulic chambers. Additionally, high hydraulic pressures are required to achieve significant preloading elongations, and the bolts are non-standard, high cost devices requiring close tolerance machining to be effective. Moreover, the principle involved inherently limits its use to large bolt or stud diameters. Obtaining uniformity of preloading of a plurality of bolts is also a problem since the preload is sensitive to the position and/or clamp load of the nut on its initial setting.

Hydraulic bolt tensioners are also known for their applicability to the tensioning bolts. These are tools which connect to the end of the bolt and tension the latter after which the nut is seated to maintain the preload after the tool is removed.

SUMMARY OF THE INVENTION

The present invention provides a mounting assembly for bearings, particularly swing bearings for cranes and the like, wherein threaded fasteners such as bolts or studs are loaded hydraulically to produce and maintain a desired preload on the bolts or studs during operation and in a manner to facilitate separation of a bearing from one of its mounting structures. The term "bolts" will be used in this specification to include studs where the context permits.

Broadly, the present invention contemplates the use of hydraulic pressure to preload bolts or similar fastening elements for mounting a bearing to maintain uniform axial tension in the elements during operation of the bearing to transmit moment, radial and axial forces.

The present invention contemplates an apparatus having a multiplicity of rolling elements for transmitting relatively high loads including moment loads between rotatable and stationary structures, one bearing member releasably connected to the second structure and a plurality of spaced elongated clamping elements extending between the bearing member and the second structure. The elements extend through receiving holes in the bearing member and second structure and piston means is provided for tensioning the elements to apply a clamping force between the bearing member and the second structure. The piston means is received in hydraulic chamber means on one of the second structure and bearing member. The hydraulic chamber means receives hydraulic pressure fluid to urge the piston means away from the bearing member and second structure to tension the elongated elements during operation of the bearing to transmit loads between the structures. Each of the elongated elements has a first means at one end thereof which interconnects the elongated element and the piston means to transmit the tensioning force from the piston means to the element; and second means at its other end for applying a clamping force to the other one of the second structure and bearing member to clamp said bearing members and second structure together. One of the first and second means comprises a separable connection for enabling the corresponding elongated element to be removed from its receiving hole in at least one of said second structure and bearing member.

In a preferred embodiment of the invention, the bolts extend through a bearing member and a bearing mounting member, i.e., structure, which are to be separably connected, to project outwardly of one of the members to receive nuts on the projecting ends. The projecting outwardly of the one member, the bolts extend through individual piston members which operate in hydraulic chambers associated with the one member so that pressure in the hydraulic chambers urges the pistons outwardly of the one member. The outward movement of the piston members is against a nut or nuts threaded onto the projecting ends of the bolts. By applying hydraulic pressure to the chambers, the bolts will be placed in tension by the force of the pistons against the nuts, and a preload clamping force will be established between the bearing member and mounting member therefor. Preferably there is an individual piston and chamber for each element with the chamber being attached to or formed in the side of the member from which the threaded end of the bolt extends. The hydraulic chambers are connected to a source of hydraulic fluid under pressure. The piping arrangement is such that a uniform static hydraulic pressure is applied and maintained in all of the hydraulic chambers to establish a uniform preloading of the bolts or studs.

In accordance with one aspect of the invention, a plurality of bolts may extend through or thread into a common piston. In the case where the bolts extend through the piston, nuts are used and are set against the common piston. In this application, the setting of the nuts against the piston should be uniform so as to obtain a uniform loading when pressure is applied. Similarly, a bolt head could be set against the common piston, or individual piston, with nuts on the other end of the bolt set to provide uniform loading. Individual pistons for each bolt may be preferable to a common piston in obtaining and maintaining uniform loading of the bolts.

In its broader aspects, the present invention also contemplates that the piston could be connected directly to the bolt shank, as by threading, to function either as the bolt head or a nut. When used as the head, the piston should be configured or other means provided to enable the nut to be torqued to position without rotation of the bolt.

BRIEF DESCRIPTION OF THE DRAWINGS

The foregoing features and other advantages of the present invention will become further apparent upon a consideration of the following description taken in conjunction with the accompanying drawings in which:

FIG. 1 is a schematic illustration of a material handling apparatus having a rotatable upper structure which is connected to a base by a bearing mounted with hydraulic fastening means constructed in accordance with this invention;

FIG. 2 is an enlarged sectional view of a portion of the hydraulic bearing mount taken generally along the line 2—2 of FIG. 1, illustrating the hydraulic means for tensioning the element;

DESCRIPTION OF THE PREFERRED EMBODIMENTS

Figure 3:
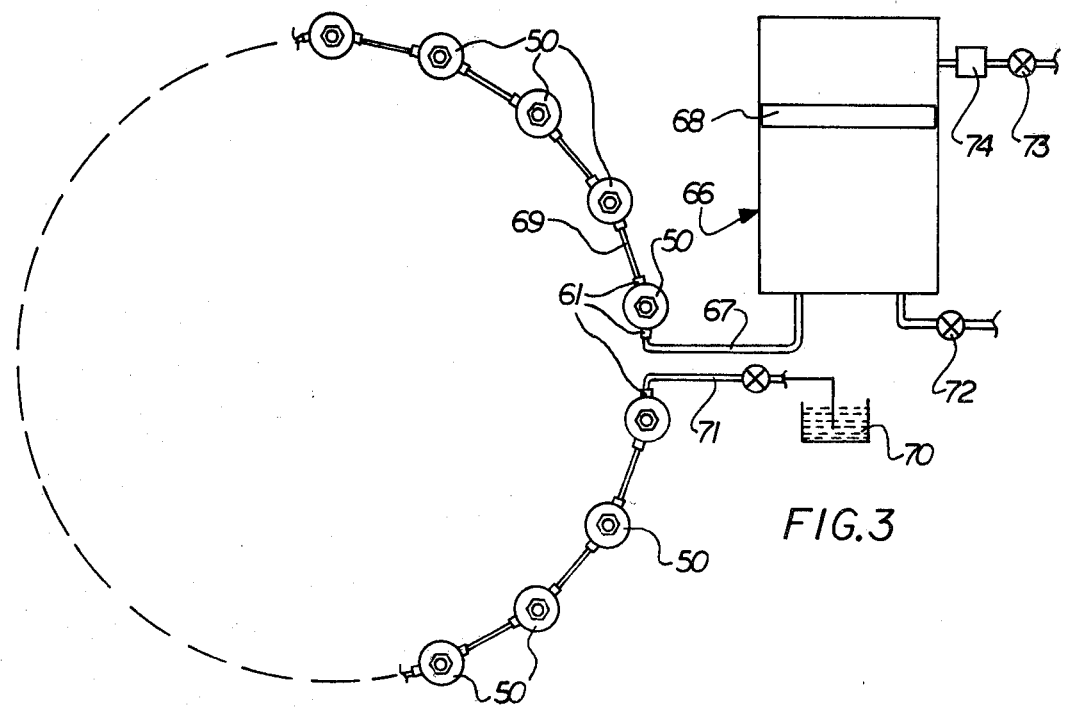
FIG. 3 is a schematic illustration of a hydraulic system incorporating several of the hydraulic cylinder chambers used in the invention.

While the present invention is capable of use in various applications where two members are to be clamped together with a preload which is to be maintained during operation, it is particularly useful in material handling apparatus such as cranes and backhoes where high moment forces must be transmitted by the bearing, and accordingly it will be described with reference to such an apparatus.

The invention is illustrated in FIG. 1 as being embodied in a material handling apparatus in the form of a crane 10 including an upper structure, generally indicated at 14, a base structure or carrier, generally indicated at 16, and a bearing 18 for supporting the upper structure 14 on the carrier 16 for rotation about a vertical axis. The carrier 16 of the crane may be of any known design such as the self-propelled carrier shown in FIG. 1. The carrier includes a bed or base 24 mounting the upper structure 14 in the manner which will hereinafter be more fully described.

The upper structure 14 of the crane 10 may be of any construction well known to those skilled in the art and as shown in FIG. 1 includes an operator's cab 20 and a pivotally mounted boom 25 which is supported for movement about a horizontal axis so that it may be raised and lowered. The boom 25 may be raised and lowered by any appropriate known means such as a cable assembly 26. A cable assembly 28 is also provided for raising and lowering a load 29 with respect to the boom 25.

The upper structure 14 including the boom 25 is mounted on the carrier 16 by the bearing 18 for rotation about a vertical axis for swinging the boom laterally. The bearing 18 must transmit axial, radial, rotational, and moment forces from the upper structure 14 to the carrier 16. While the bearing may have many possible configurations of rolling elements, the bearing 18 illustrated in FIG. 2 has a two-piece outer bearing member or ring 32 which provides the outer race of the bearing 18 and an inner bearing member or ring 34 providing races for anti-friction elements 35.

The outer bearing member 32 is bolted to the underside 36 of the upper structure 14 by a plurality of bolts 38 and their cooperating nuts 40. The inner bearing member 34 has a gear 39 formed on its inside diameter with which a gear motor, not shown, mounted on the underside of the upper structure 14 cooperates to rotate the upper structure about the axis of bearing 18.

The inner bearing member 34 rests on a bearing support pad 42 welded or otherwise secured to the bed 24 of the carrier 16 to form a part of the bed. A plurality of uniformly spaced bolts 44 extend through the inner bearing member 34, the bearing support ring 42, and the bed 24 to extend from the lower side thereof for the purposes of clamping the bearing 18 to the bed and transmitting radial, moment, axial, and rotational forces from the upper structure to the bed.

The bolts 44 extend downwardly from the bed 24 through individual pistons 46 which abut nuts 48 threaded onto the lower end of the bolts. The pistons 46 operate in individual hydraulic cylinder chambers 50 secured to the underside of the bed 24 to provide a single acting piston-cylinder arrangement. When hydraulic fluid under pressure is introduced into a cylinder chamber 50, the piston therein is urged downwardly against the nut and the bolts 44 are tensioned axially to apply a preload clamp force between the inner bearing ring 34 and the bed of the carrier.

In the embodiment of FIG. 2, the pistons 46 each have a reduced portion 54 at the top, i.e., head, adjacent the bottom 56 of their cylinder chambers to provide an annular chamber space 58 at the top, i.e., head, of the piston which is adjacent the bottom of the cylinder chamber. If a plurality of cylinders are parallel connected, hydraulic fluid pressure may be conveyed into and between the chamber spaces, including the annular space 58, through opposed ports 60 in the cylinder walls each having an external fitting 61.

The piston heads are formed with pads 62 to prevent the topmost part of the piston head from fully bottoming against the bottoms of the chambers to enable the hydraulic fluid to work over substantially the entire top of the piston.

The pistons 46 are free to move on the bolts 44, and each piston and cylinder arrangement is sealed by an O-ring 63 in the bolt opening in the bottom wall of the cylinder chamber, an O-ring 64 between the piston and the bolt through the piston and an O-ring 65 between the piston and the cylinder chamber wall. Alternately, the pistons may thread onto the bolts 44.

The bolt holes for the bolts 44 in the inner bearing member 34, the bearing pad 42 and the bed 24 are oversized for the bolt so that the bolts 44 are loose fitting. This allows a limited amount of self-alignment of the bolts with the piston and cylinder arrangements and enables the various elements to be readily assembled without requiring precise manufacture or precise alignment. Each piston and cylinder arrangement may also be mounted on the underside of the bed so as to have limited adjustability relative to the bed and the bolt hole therein to faciliate assembly.

In accordance with the invention, the cylinder chambers 50 are connected or adapted to be connected to a source of pressurized hydraulic fluid which may be part of the hydraulic mechanism of the machinery on the crane or separate, i.e., a portable hydraulic hand pump. Various arrangements might be utilized. One such hydraulic arrangement is illustrated schematically in FIG. 3.

In FIG. 3 the cylinder chambers 50 are connected to each other in sequence and to an accumulator 66 having a floating piston 68. The accumulator 66 has a pressure fluid connection 67, preferably flexible, to an external fitting 61 on one of the cylinder chambers 50, the latter having its other external fitting 61 connected by a conduit 69, preferably flexible, to an external fitting 61 on the next adjacent cylinder cyamber 50. In the preferred embodiment, the conduit 69 may be a flexible metal tube or a hose, although a rigid connection, preferably with provision for lateral and lengthwise movement may be used. Similar conduits 69 are also used to interconnect the remaining cylinder chambers 50 in sequence in a similar manner. However, the last cylinder chamber 50 of the sequence has one of its ports connected through one of its external fitting 61 to a reservoir 70 by a conduit 71.

Hydraulic fluid for filling or charging the accumulator 66 may be supplied through a fill valve 72 which is closed after charging. The floating piston 68 separates the hydraulic fluid from an air chamber which may be under pressure from the air system of the machine through a valve 73 and a pressure regulator 74, or the accumulator air pressure may be established after the hydraulic system is filled and then sealed, to establish a static hydraulic pressure in the system.

Alternatively, the cylinders can be connected, preferably through an accumulator, to a continuously operating source of static hydraulic pressure with the connection 71 being available for pressure release. If the source and/or an accumulator is on the upper structure, connection to the chambers can be made through a rotary type gland on the axis of rotation of the bearing in a manner well known to those skilled in the art.

Figure 4:
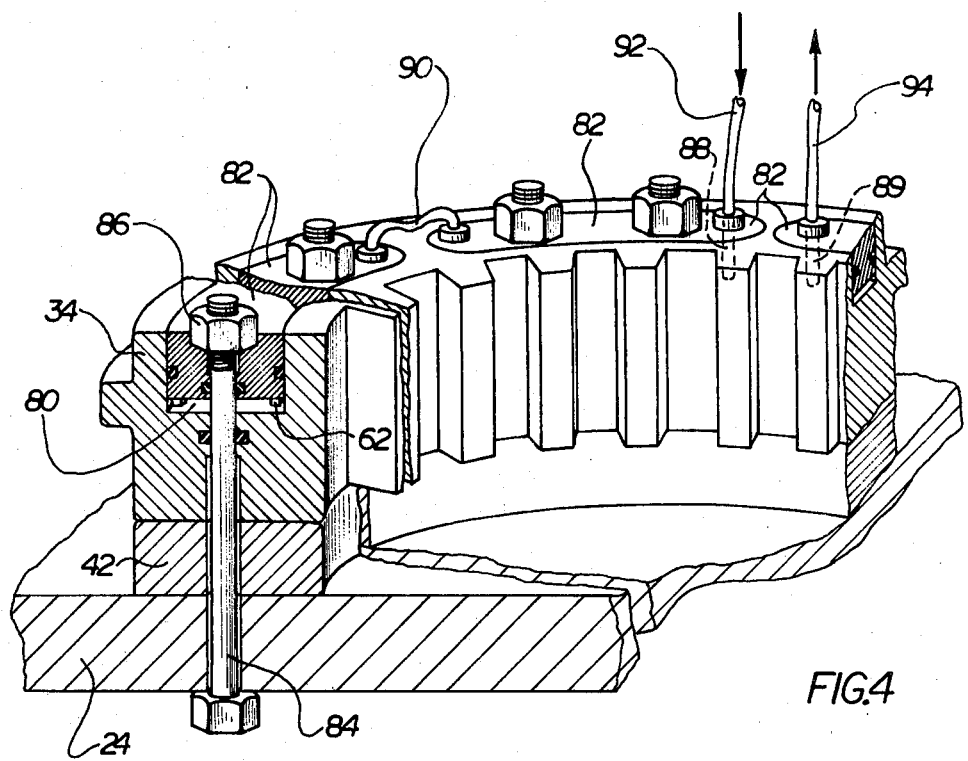
FIG. 4 is a perspective view illustrating a second embodiment of the tensioning means of the present invention.

The embodiment of FIG. 4 illustrates a modification of the embodiment of FIGS. 1 to 3 in which clamp ring segments act as the piston means for a plurality of bolts, and in which the piston-cylinder arrangements are associated with the inner bearing member. It is obvious that the embodiment of FIGS. 1 to 3 may be modified to include either or both of these concepts.

In the embodiment of FIG. 4, the inner bearing ring 34 is formed with a segmented annular cylinder chamber, comprising chamber segments 80, on its side away from the bed 24. A segmented clamp ring comprising pistons 82 which operates in a respective cylinder chamber 80 and bolts 84 extend from the underside of the bed 24 through the bearing pad 42, the inner bearing member 34, including the chamber segments 80 therein, and the pistons 82 to receive nuts 86 threaded onto the projecting ends of the bolts. A plurality of bolts 84 pass through each piston 82 and the nuts 86 are set against the pistons with the nuts being initially set to a uniform torque in the absence of hydraulic pressure.

In the embodiment of FIG. 4 the static pressure of the hydraulic fluid is supplied to the chamber segments through vertical passages 88 in the pistons 82. Each piston has such a passage 88 for receiving hydraulic fluid and supplying it to the chamber segment 80, and another passage 89 for discharging hydraulic fluid through a flexible tube or hose 90 to the next adjacent chamber segment 80. Similar tubes or hoses 90 are used to interconnect the remaining chamber segments 80 in series. The passage 89 of the last chamber segment in the sequence is connected to a return, or drain or bleed connection, by a conduit 94, and the adjacent chamber segment at the beginning of the sequence has its passage 88 connected by a conduit 92 to the fluid supply. The supply and return, or drain or bleed, may be as described in connection with FIG. 3. When fluid is introduced into the system, the individual chamber segments 80 are pressurized uniformly, thereby urging the pistons 82 outwardly against the nuts 86 and tensioning the bolts 84 to apply a clamping force between the inner bearing ring 34 and the bed 24 of the carrier.

Figure 5:
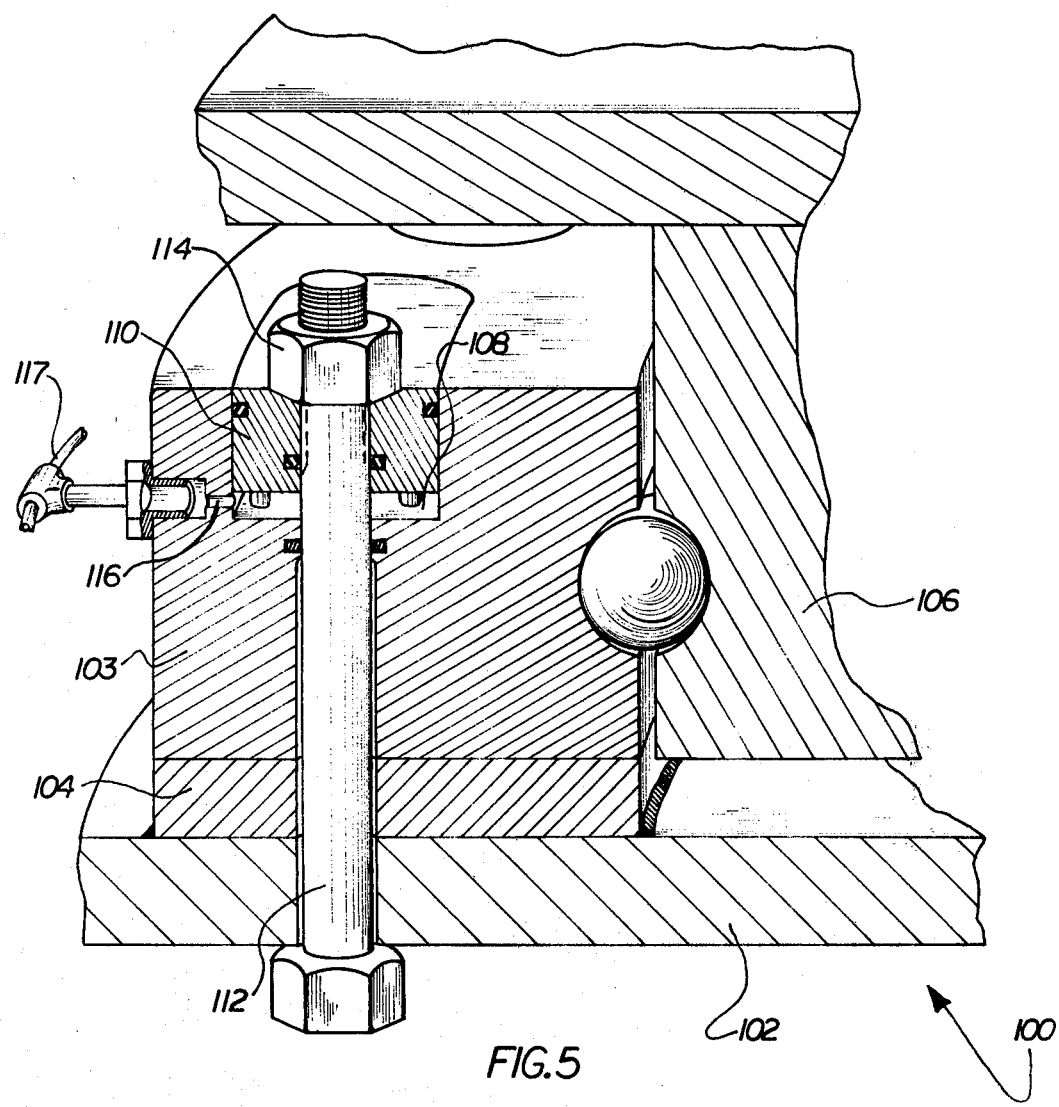
FIG. 5 is a fragmentary view, also taken generally along the line 2—2 of FIG. 1 illustrating yet another embodiment of the present invention.

The embodiment of FIG. 5 illustrates the incorporation of the hydraulic bearing mounting system of FIG. 4 into a bearing 100 for connecting an upper works (not shown) to a carrier bed 102. The bearing 100 is a ball-type bearing and has an outer bearing ring 103 clamped against a pad 104 on the carrier bed 102, and an inner bearing ring 106 connected to the upper works in a conventional and known manner.

The outer bearing ring 103 has an annular cylinder chamber formed by chamber segments 108 corresponding to the chamber segments 80 of FIG. 4, and clamp ring pistons 110 operating therein corresponding to the pistons 82 of FIG. 4. Each piston 110 operates to apply a clamp force to a plurality of bolts 112 (only one being shown in the drawing) for clamping the outer bearing ring 103 against the pad 104. As in the embodiment of FIG. 4, a nut 114 on the bolt is set against its corresponding piston 110 with a uniform torque prior to applying hydraulic pressure to the chamber segments 108. When hydraulic fluid under pressure is introduced into the system, the individual chamber segments 108 are pressurized uniformly, thereby urging the pistons 110 outwardly against the nuts 114 and tensioning the bolts 112 to apply a clamping force between the inner bearing ring 106 and the bed 102 of the carrier.

Each chamber segment 108 has a hydraulic fluid connection 116 from the chamber to the outside peripheral wall of the outer bearing ring and thence to a common hydraulic fluid line 117, for supplying pressure fluid to and draining pressure fluid from the chambers.

While it is preferred to utilize nuts in the embodiment of FIGS. 4 and 5, the bolts may be threaded into apertures in the pistons preferably utilizing locking threads, with the bolt heads being uniformly torqued. Similarly, the orientation of the bolts may be reversed, having the bolt heads abutting the pistons and nuts on the other end below the bed. Also, studs in some cases may be fixed to the piston while retaining a threaded releasable connection at the other end. As is also clear from the foregoing, similar variations may be embodied in the system of FIGS. 1 to 3.

I claim:

1. In an apparatus having a multiload rolling contact bearing for transmitting relatively high loads including moment loads between first and second structures and having a bearing member releasably connected to said second structure and a plurality of spaced elongated clamping elements extending between said bearing member and said second structure, said elements extending through receiving holes in said bearing member and second structure, the improvement comprising piston means for tensioning said elements to apply a clamping force between said bearing member and said second structure, said piston means being received in hydraulic chamber means on one of said second structue and said bearing member for receiving hydraulic pressure fluid to urge said piston means away from said bearing member and said second structure for tensioning said elements during operation of said bearing to transmit loads between said structures, each of said elongated elements having first means at one end thereof for transmitting the force of said piston means to tension the element and second means at its other end for applying the force of said piston means to one of said second structure and said bearing member to clamp said second structure and bearing member together with one of the first and second means comprising a separable connection for enabling the element to be removed from its receiving hole in at least one of said second structure and said bearing member.

2. In an apparatus as defined in claim 1 wherein one of said first and second means for each element comprises a threaded portion engaging and cooperating with a threaded portion on the elongated element with the threaded portions being relatively rotatable for establishing an initial pre-stressing of the element independent of hydraulic forces.

3. In an apparatus as defined in claim 2 wherein said elongated elements are bolts.

4. In an apparatus as defined in claim 2 wherein said elements are bolts and the threaded portion of one of said first and second means for each element comprises a nut engaging said piston means or one of said bearing member and second structure.

5. In an apparatus as defined in claim 4 in which said first means for said elements each comprises a bolt head engaging one of said bearing member and second structure and said second means comprises a nut having a threaded portion cooperating with a threaded portion on the bolt and engaging said piston means.

6. In an apparatus as defined in claim 2, 3, 4 or 5 in which said piston means comprises individual piston means for each of the elements with the individual piston means operating in an individual chamber means.

7. In an apparatus as defined in claim 2 or 5 in which said piston means comprises individual piston means for each of the elements with the individual piston means operating in an individual chamber means, said elements being received in holes in said bearing member and said second structure which are oversized for the element.

8. In an apparatus as defined in claim 2 in which said elements are received in holes in said bearing member and second structure which are oversized for the elements.

9. In an apparatus as defined in claim 1 wherein said piston means comprises a plurality of pistons and a plurality of said elongated elements are received and tensioned by each piston.

10. In an apparatus as defined in claim 9 wherein said elements comprise elements each extending through said piston means and terminating in end portions having abutment means for transmitting movement of said pistons to the element in a direction away from said bearing member and said second structure.

11. In an apparatus as defined in claim 10 wherein said end portions of said elements are threaded and said abutment means comprises nuts.

12. In an apparatus as defined in claim 11 wherein said nuts and pistons are operable to set said piston means to their limit of inward movement toward said bearing member and second structure to uniformly load said element in the absence of hydraulic pressure in said chamber means.

13. An apparatus in which a bearing and a base are held against relative movement under the influence of fluid pressure, said apparatus comprising a first bearing member having a first race, a second bearing member having a second race, a plurality of anti-friction elements disposed in engagement with said first and second bearing races, a base member, and connector means for releasably connecting said first bearing member with said base member, said connector means including a solid longitudinally extending connector member, piston and cylinder means for forming a chamber extending around the outside of a portion of said connector member, means for applying an initial axial loading to said connector member while there is a relatively low fluid pressure in said chamber to hold said first bearing member and base member against movement relative to each other under the influence of the initial axial loading applied to said connector member, and means for conducting a relatively high fluid pressure to said chamber to increase the fluid pressure in said chamber and to increase the axial loading applied to said connector member from the initial axial loading to a second axial loading to hold said first bearing member and base member against movement relative to each other under the influence of the second axial loading as long as the relatively high fluid pressure is maintained in said chamber.

* * * * *